(12) United States Patent
Heffernon

(10) Patent No.: US 8,641,001 B2
(45) Date of Patent: Feb. 4, 2014

(54) WALL MOUNTING SYSTEM

(76) Inventor: Travis Heffernon, Spring Hill, KS (US)

( * ) Notice: Subject to any disclaimer, the term of this patent is extended or adjusted under 35 U.S.C. 154(b) by 164 days.

(21) Appl. No.: 13/213,825

(22) Filed: Aug. 19, 2011

(65) Prior Publication Data

US 2012/0043442 A1 Feb. 23, 2012

Related U.S. Application Data

(60) Provisional application No. 61/375,655, filed on Aug. 20, 2010.

(51) Int. Cl.
*E04G 5/06* (2006.01)
*F21V 21/00* (2006.01)

(52) U.S. Cl.
USPC .......... 248/224.8; 248/466; 248/489; 428/16; 428/542.4

(58) Field of Classification Search
USPC ............ 248/224.8, 466, 489, 225.11, 225.21, 248/223.31, 224.7, 342, 916, 915; 428/16, 428/542.4, 913.3
See application file for complete search history.

(56) References Cited

U.S. PATENT DOCUMENTS

| 2,354,622 | A | * | 7/1944 | Swartz | 40/800 |
| 3,529,799 | A | * | 9/1970 | Schaefer | 248/496 |
| 3,861,639 | A | * | 1/1975 | Morrill | 248/489 |
| 4,464,440 | A | * | 8/1984 | Dotzman | 428/542.4 |
| 6,719,260 | B1 | * | 4/2004 | Hart | 248/479 |
| 6,828,035 | B1 | * | 12/2004 | Goettl | 428/542.4 |
| 8,091,852 | B2 | * | 1/2012 | Vassallo | 248/475.1 |
| 2010/0072339 | A1 | * | 3/2010 | Powell et al. | 248/231.91 |
| 2012/0112022 | A1 | * | 5/2012 | Cheng | 248/205.3 |

* cited by examiner

*Primary Examiner* — Anita M King
(74) *Attorney, Agent, or Firm* — Hovey Williams LLP

(57) ABSTRACT

A wall hanging system is provided for mounting of heavy, high cantilever load objects to an upright wall, such as a big game trophy comprising a backer board with a central opening. The system includes a bracket secured to the rear face of backer board and having a forwardly extending housing. The housing includes an arcuate, inclined, hanging wall section defining a mounting recess. The system also has a hanger including an inclined, arcuate, upper, support surface, which is received within the recess such that the hanging and support surfaces are disposed in mating engagement throughout a fore-and-aft depth of at least about one-quarter inch, and through an arc of at least about 120°.

22 Claims, 7 Drawing Sheets

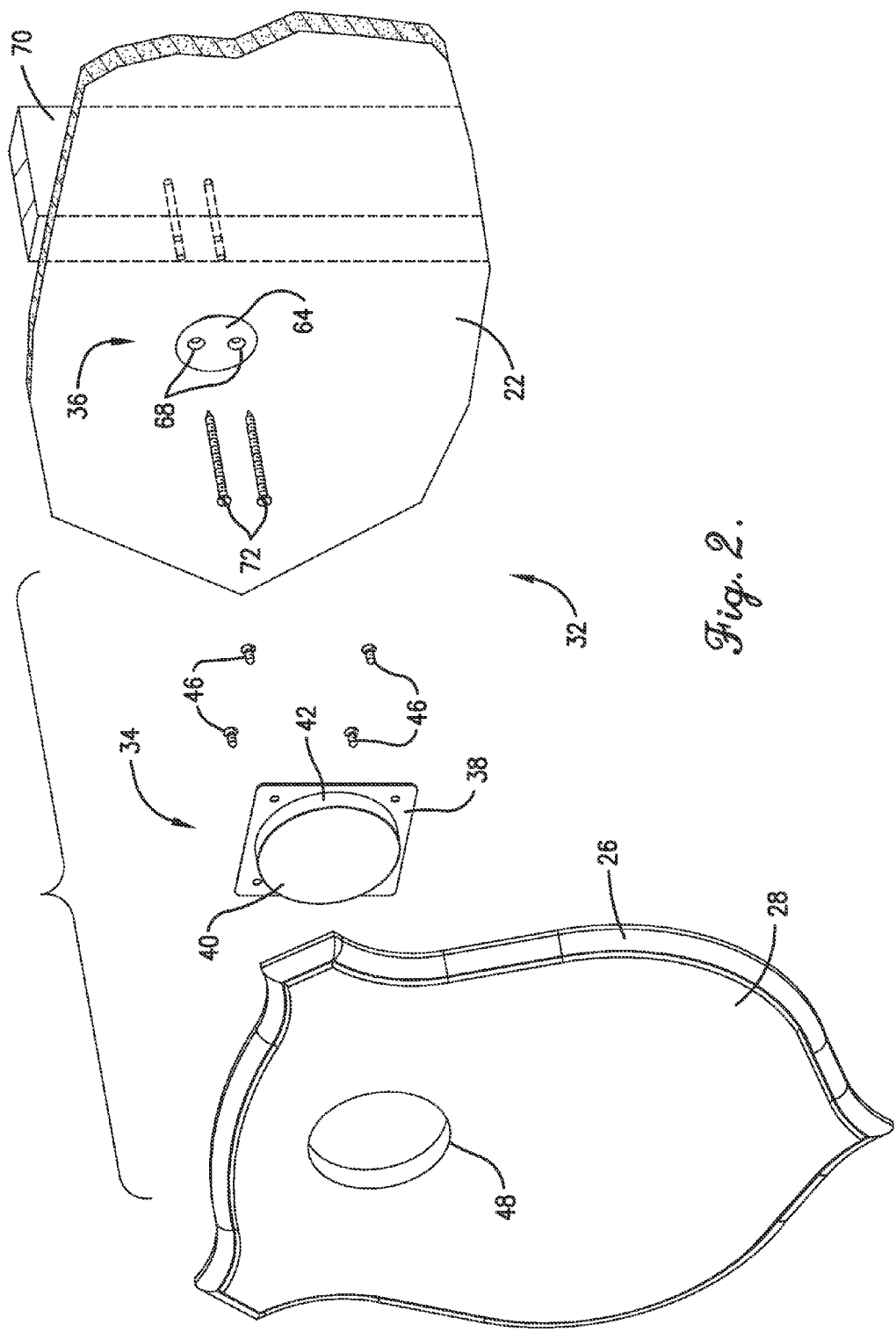

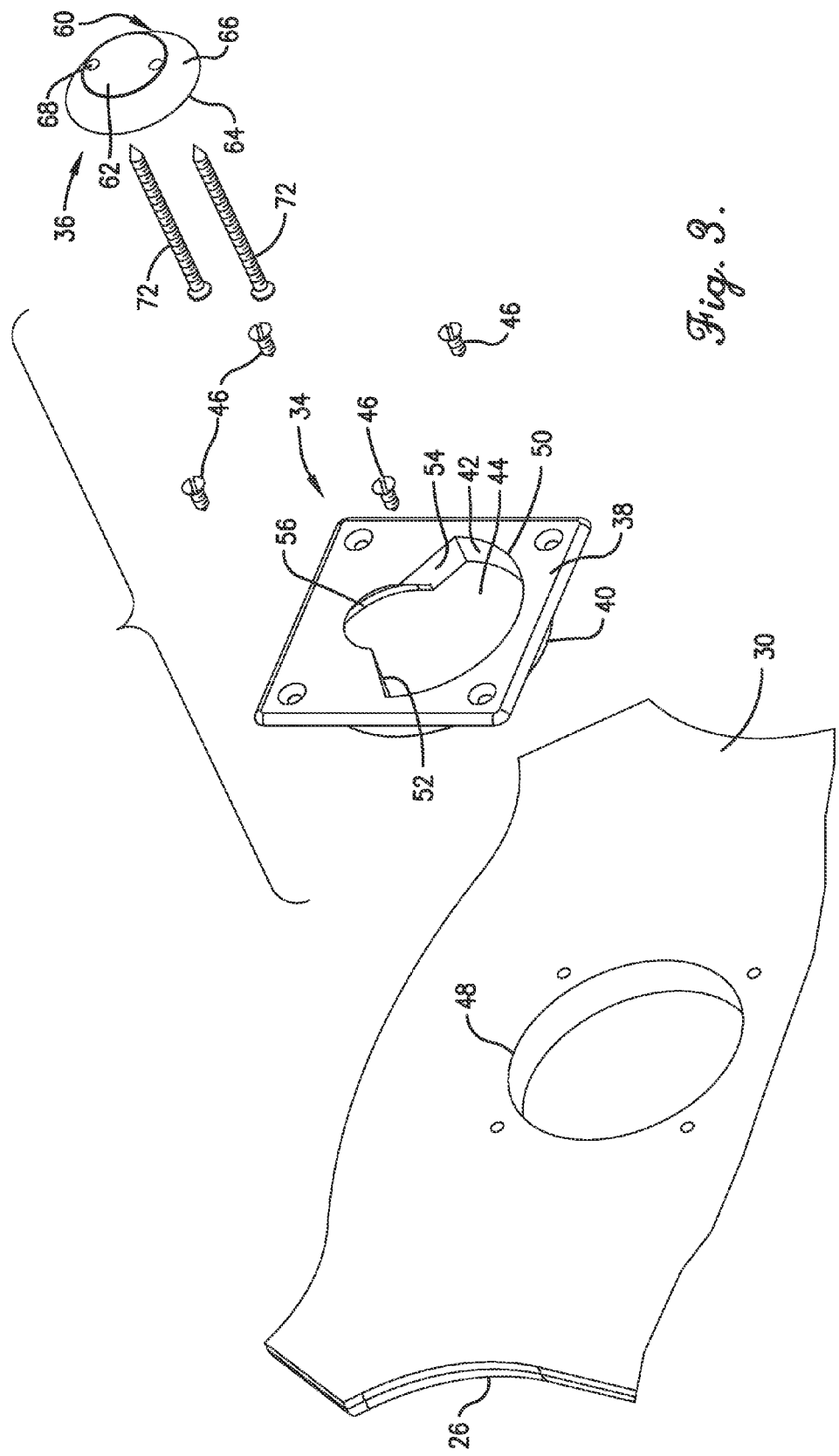

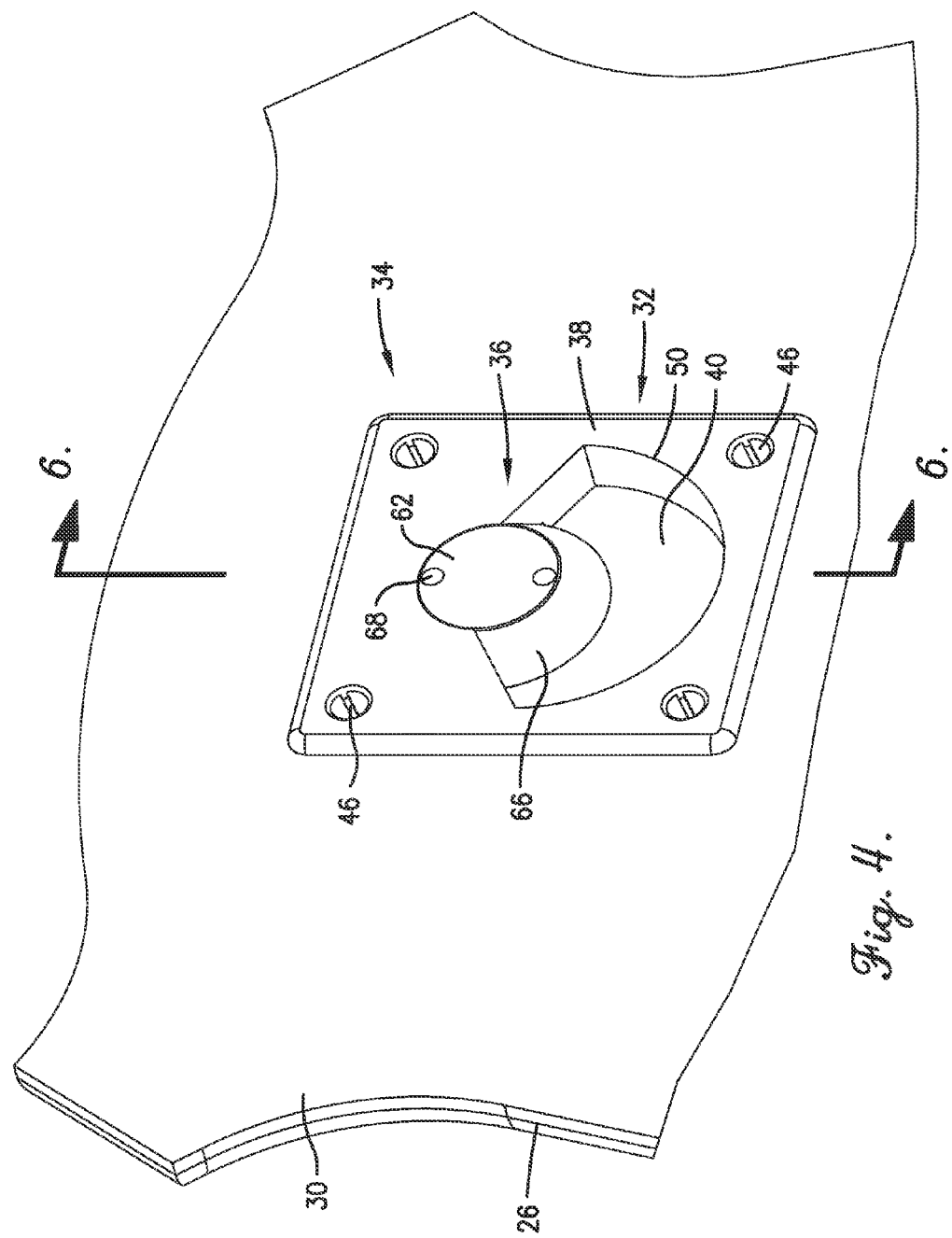

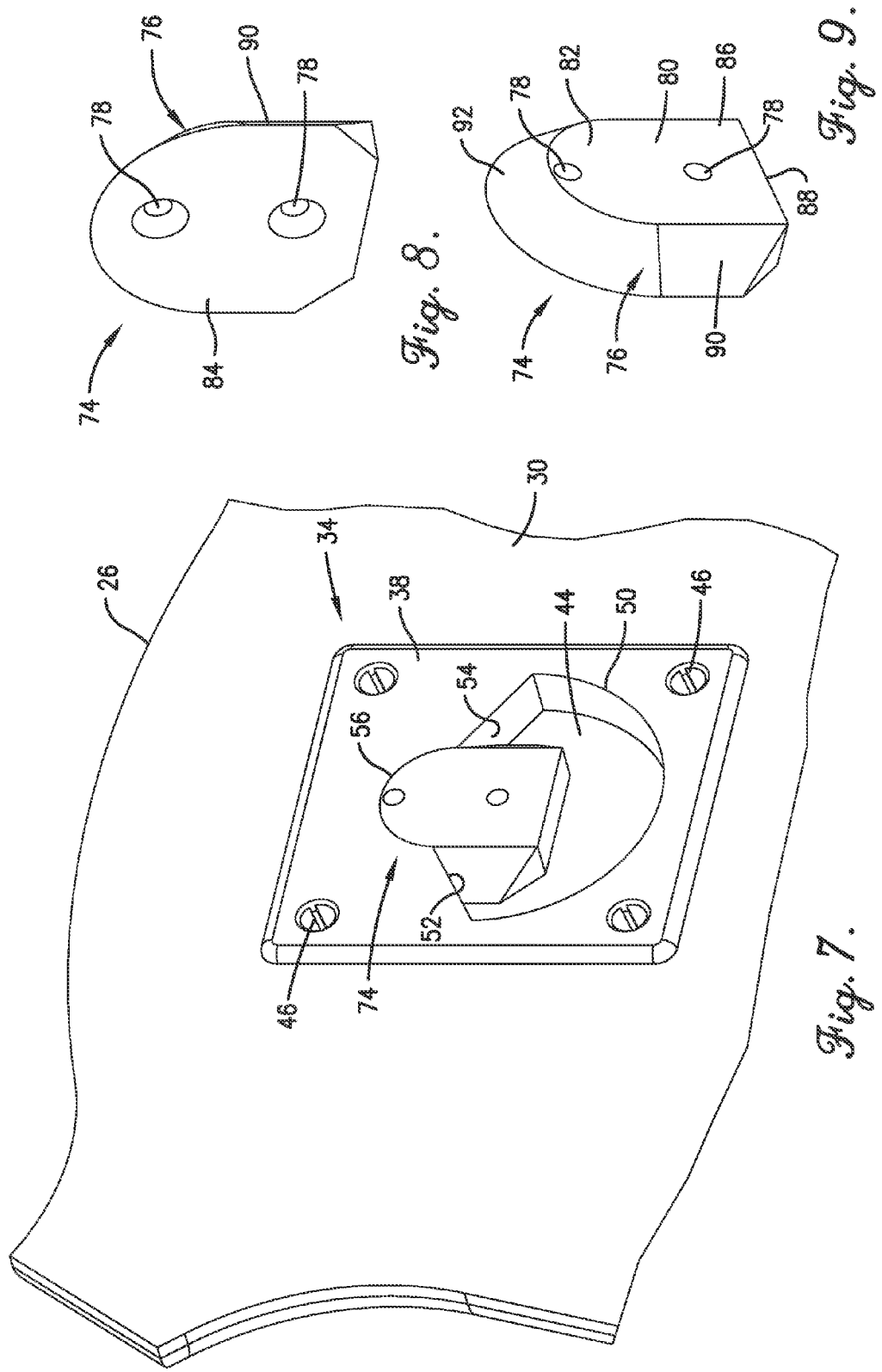

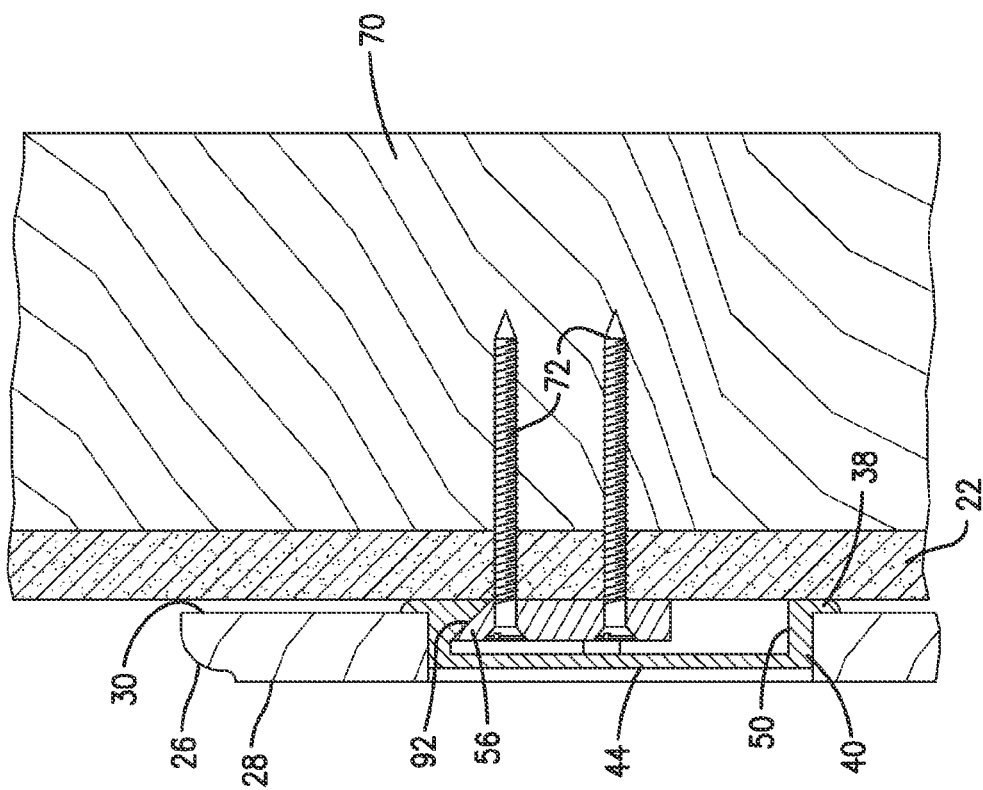

WALL MOUNTING SYSTEM

CROSS-REFERENCE TO RELATED APPLICATION

The present application claims the benefit of and priority from U.S. Provisional Patent Application No. 61/375,655, filed Aug. 20, 2010, the entire disclosure of which is hereby incorporated by reference herein.

BACKGROUND OF THE INVENTION

1. Field of the Invention

The present invention is broadly concerned with wall mounting systems for securely mounting high cantilever load objects on a wall to form a generally flush, secure, safe, and reliable mounting of the objects. More particularly, the invention is concerned with such mounting systems that are especially useful for mounting big game trophies, wherein the trophies include a backer board having a rear face concavity. Such mounting systems broadly include a bracket attachable to the rear face of the backer board with a projection extending into the concavity, and having a segment presenting an inclined hanging surface. A hanger also forms a part of the system and is configured for attachment to a wall and has an inclined support surface. The hanger support surface extends into the projecting segment of the bracket, with the support and hanging surfaces being disposed in face-to-face, mating engagement.

2. Discussion of the Prior Art

Those of ordinary skill in the art will appreciate that many hunters decorate their homes and offices with wall-mounted hunting trophies (e.g., big game shoulder mounts). Such trophies typically include a backer board configured for disposition against the wall. The backer board may be simply attached to a rear end of a taxidermy manikin, or may be in the form of a shield or the like with the trophy mounted on and projecting outwardly and upwardly therefrom. As such, the complete trophy can be relatively heavy and can also create substantial cantilever loads when mounted on the wall. It is therefore imperative that a safe and secure mounting system be employed to ensure that the trophy stays in place and does not fall.

In the past, attempts have been made to use conventional picture-hanging mounts with animal trophies. This has proved to be somewhat problematic, because such conventional mounts are not designed to absorb the cantilever loads imposed by a big game trophy. Even the most sturdy of picture-hanging mounts do not have sufficient structural integrity to ensure the safe mounting of a large big game trophy. Moreover, traditional mounts have protruded outwardly from the backer board, possibly increasing instability of the hanging trophy.

There is accordingly a real and unsatisfied need in the art for a secure mounting system for high cantilever load objects, such as big game trophies, and which can be easily and safely installed on a variety of walls.

SUMMARY

The present invention overcomes the problems outlined above and provides a wall mounting system for securely mounting objects, such as high cantilever load objects, on a wall, where the object has a support member presenting a substantially flat rear face and a concavity extending forwardly from the rear face. The mounting system includes a bracket configured for attachment to the rear face, with a projecting segment extending into the concavity. The segment presents an inclined hanging surface. The system further includes a hanger configured for attachment to the wall, with an inclined support surface. The hanger is configured to extend into the projecting segment of the bracket, with the support surface and the hanging surface being disposed in face-to-face, mating engagement.

In preferred forms, the support surface and the hanging surface are in flush contact with each other throughout a depth within the segment of at least about one-quarter inch, and more preferably at least about one-half inch. To this end, the preferred bracket includes a primary plate engageable with the rear face of the backer board, and an integral, forwardly extending, hollow housing which extends into the backer board concavity. Moreover, the hanging surface is arcuate, located adjacent the upper end of the housing, and defines a recess. The preferred hanger is of substantially frustoconical configuration with a smaller diameter end and a larger diameter end. A support surface extends between the smaller and larger diameter ends, so that the support surface fits within the recess and engages the arcuate hanging surface of the bracket. In further preferred forms, the hanging and support surfaces are in face-to-face engagement throughout an arc of at least about 120°, and more preferably at least about 180°.

The invention also includes the combination of a high cantilever load object, such as a big game trophy, with the support system, as well as the combination of a load object and a bracket of the type described.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 2 is a fragmentary, perspective, exploded view illustrating the components of the mounting assembly and the backer board of the trophy;

FIG. 3 is a fragmentary, perspective, exploded view similar to that of FIG. 2, but illustrating the components of the mounting assembly and the backer board from a direction opposite that of FIG. 2;

FIG. 4 is a fragmentary, perspective view illustrating the mounting assembly operatively secured to the trophy backer board;

FIG. 7 is a fragmentary, perspective view of another mounting assembly in accordance with the invention;

FIG. 8 is a perspective view of one face of the wall-mounted component of the assembly illustrated in FIG. 7;

FIG. 9 is a perspective view of the wall-mounted component illustrated in FIG. 8, but viewing the face thereof opposite that shown in FIG. 8; and FIG. 10 is a fragmentary, vertical sectional view illustrating the mounting assembly of FIGS. 7-9 supporting a trophy.

Figure 1:
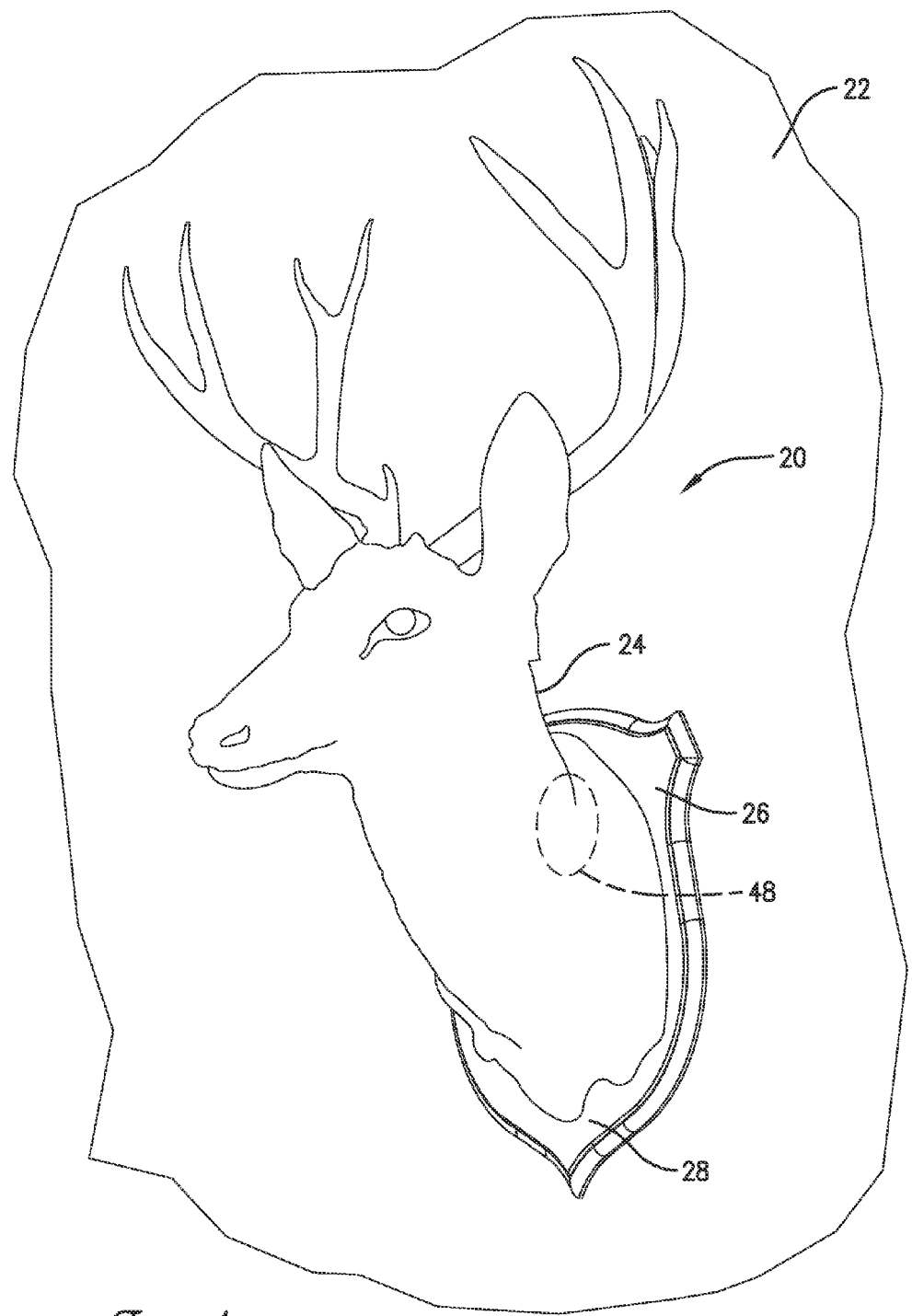
FIG. 1 is a perspective view of a shoulder-mount big game trophy mounted on a wall using the mounting assembly of the invention.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With reference now to the drawings, a high cantilever load object 20 designed for mounting on a wall 22 is illustrated in FIG. 1. In this instance, the object comprises a shoulder-mount big game trophy 24 secured to a shield or backer board 26. The backer board 26 presents a front face 28 and an opposed rear face 30 (see FIG. 4). Although the illustrated backer board 26 extends laterally outwardly from a base portion of the trophy 24, the backer board of an alternative mountable object may be simply attached to a rear end of a taxidermy manikin, as will be readily appreciated by one of ordinary skill in the art.

While the present invention is particularly advantageous for supporting a high cantilever load object, such as the depicted big game trophy 24, other types of objects designed to be hung or suspended from an upright wall are equally applicable. For example, other sporting trophies such as small game (e.g., quail, pheasants, ducks, geese, rabbits, squirrels, or fish), or even non-game objects, may be used without departing from the teachings of the present invention, as will be understood by one of ordinary skill in the art upon review of this disclosure.

The illustrated trophy 24 is mounted on the wall 22 by way of a multiple-component assembly or hanging system 32, which broadly includes a bracket 34 and a hanger 36. The bracket 34 is preferably formed of metal, such as anodized aluminum, although another substantially rigid material (e.g., a synthetic resin material) may alternatively be used. The hanger 36 is preferably formed of the same material, although such conformity is not necessarily required.

The bracket 34 includes an apertured primary plate 38 and an integral, forwardly extending, hollow housing 40. The hollow housing 40 presents a continuous, forwardly extending sidewall 42 and a transverse back wall 44. The bracket 34 is secured to the rear face 30 of the backer board 26 by fasteners in the form of screws 46. In this way, the housing 40 is received within a centrally located, circular through opening 48 in the backer board 26.

Figure 5:
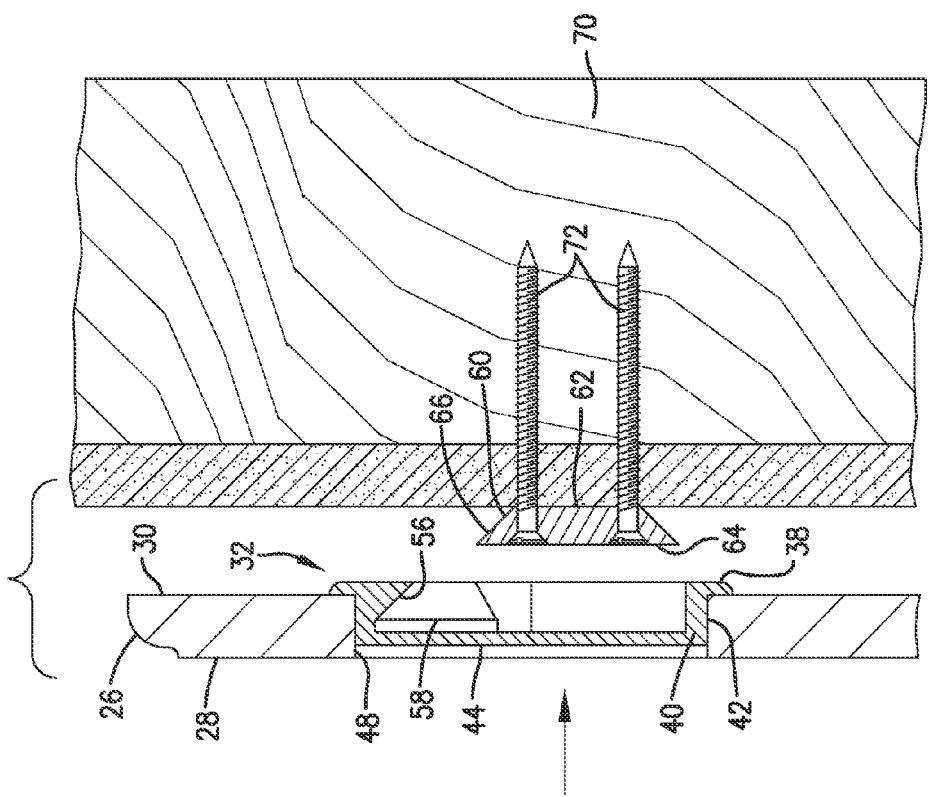
FIG. 5 is a fragmentary, vertical sectional view of the mounting assembly and trophy backer board during installation of the trophy on a wall using the mounting assembly of the invention.

Referring specifically now to FIGS. 3-5, it will be observed that the forwardly extending sidewall 42 presents a lowermost arcuate section 50, a pair of upper, inwardly extending rectilinear sections 52 and 54, and an uppermost substantially semicircular section 56. The sections 50-54 extend forwardly in a substantially perpendicular relationship relative to the primary plate 38. However, the uppermost section 56 throughout its length is obliquely oriented at an angle of approximately 45° in a reverse direction from the back wall 44. Although an angle of approximately 45° is depicted and preferred, it will be readily understood upon review of this disclosure that the uppermost section 56 may be obliquely oriented at an alternative suitable angle (such as within a range of about 35° to about 75°) without departing from the teachings of the present invention.

Moreover, the uppermost section 56 extends through an arc of approximately 180°. While an arc of approximately 180° is depicted and preferred, it will be readily understood upon review of this disclosure that the uppermost section 56 may instead extend through an alternative suitable arc (such as at least about 90° and preferably at least about 120°) without departing from the teachings of the present invention. It will be appreciated that the configuration of the uppermost wall section 56 creates an arcuate, recessed region 58, which is important for purposes to be described.

In one embodiment, as depicted particularly in FIGS. 2-6, the hanger 36 is preferably in the form of a frustoconical member 60. The frustoconical member 60 presents a small diameter rear face 62, a larger diameter outer face 64, and an arcuate, obliquely extending sidewall 66 lying at an angle of about 45° between the faces 62, 64. Although an angle of approximately 45° between the faces 62, 64 is depicted and preferred, another angle between the faces 62, 64 may be alternatively provided, so long as such alternative angle at least substantially corresponds with the angle of the uppermost section 56, as will be readily appreciated by one of ordinary skill in the art upon review of this disclosure. The member 60 has a pair of through apertures 68, such that the member 60 may be secured to the wall 22 (preferably at a stud 70) by fasteners in the form of screws 72.

In use, when the trophy 24 is mounted on the wall 22, the member 60 is secured to the wall 22 by way of the screws 72, with the smaller diameter face 62 disposed in contact with the wall 22 (see FIG. 5). The bracket 34 is installed on the backer board 26 (with the housing 40 being at least partially received therein) by way of the screws 46, with the uppermost wall section 56 being disposed at the center and top of through opening 48. At this point, the trophy 24 is elevated until the hollow region of the housing 40 below the uppermost section 56 is directly adjacent the mounted member 60 (see FIG. 5).

Figure 6:
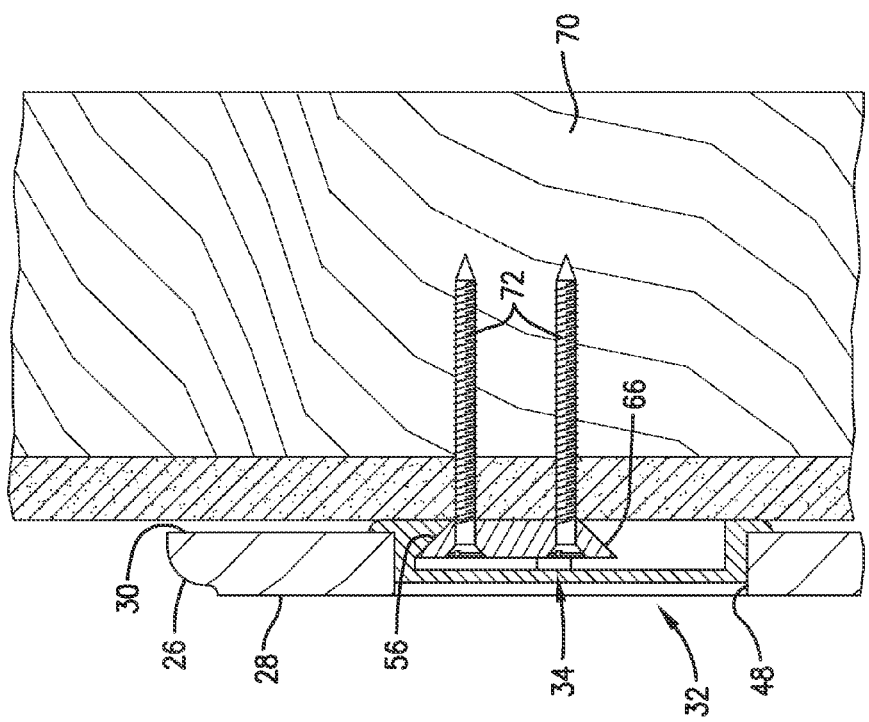
FIG. 6 is a fragmentary, vertical sectional view taken along the line 6-6 of FIG. 4, and illustrating the mounting assembly supporting the trophy.

The trophy 24 (with the bracket 34 secured thereto and at least partially received therein) is then moved rearwardly until the member 60 is within the confines of the housing 40, whereupon the trophy 24 is moved downwardly so as to seat the member 60 within the upper arcuate section of the housing 40 defined by the wall section 56 (see FIG. 6). In this orientation, it will be observed that the member 60 is seated within the recessed region 58, with the uppermost section 56 in close, face-to-face mating engagement with the sidewall 66 of the member 60.

Preferably, the walls 56, 66 are in face-to-face mating engagement along a fore-and-aft depth of at least about one-quarter inch. Moreover, this face-to-face mating engagement should extend through an arc of at least about 120°, and more preferably through an arc of about 180°. As such, it will be appreciated that the sidewall 66 of the member 60 defines a support surface, whereas the mated uppermost wall section 56 of the bracket 34 defines a corresponding hanging surface.

The system 32 is capable of supporting a variety of high cantilever load objects, such as trophy the 24. The close interfitting relationship between the member 60 and the bracket 34 provides substantial resistance against significant cantilever loads, and safely maintains the suspended objects without fear of failure, as will be readily appreciated by one of ordinary skill in the art upon review of this disclosure.

Optionally, the system 32 may further include a trophy-specific label (not shown), such as a die cut trophy memorabilia graphic, disposed within the cavity of the hollow housing 40 of the bracket 34, preferably against the transverse back wall 44. The addition of such a label can provide a convenient display of information specific to the trophy 24 (e.g., date, state, county, score, and weight). Because such a label may be disposed within the cavity of the hollow housing 40 of the bracket 34 (with the bracket 34 being secured to the trophy 24), the information would remain associated with particular trophy.

Furthermore, given the easy removal of the bracket 34 from the hanger 36, it would be a simple procedure to dismount the trophy 24 from the wall 22 in order to expose the information. The inclusion of a trophy-specific label, which may be shaped to correspond to an inside surface of the back wall 44 of the bracket 34, allows the hunter to conveniently look back and reflect on the hunt in which the trophy 24 was taken. Such inclusion can also allow the information to be easily passed on to others (perhaps many years down the road), who may inherit or otherwise come to possess the trophy 24, ensuring that the relevant information remains associated therewith and available.

Turning now to FIGS. 7-10, another embodiment of the invention making use of a modified hanger 74 is illustrated. The modified hanger 74 includes a linearly-sided member 76 having a pair of mounting apertures 78. In this embodiment, the bracket 34 of the first embodiment is employed, and thus need not be further described again here.

However, the modified hanger 74 in this instance is not frustoconical in shape (as is member 60), but rather takes the form of the linearly-sided member 76. The linearly-sided member 76 includes a lower segment 80 and an upper, rounded segment 82. The segments 80,82 cooperatively present a front face 84, a rear face 86, a bottom surface 88, upright, laterally spaced apart sidewall sections 90, and a inclined arcuate top wall 92.

The top wall 92 lies at an angle of approximately 45°, and is designed to mate with the bracket wall section 56 within the region 58 (similar in many respects to the obliquely extending sidewall 66 of the member 60 described above). Although an angle of approximately 45° for the top wall 92 is depicted and preferred, another angle for the top wall 92 may be alternatively provided, so long as such alternative angle at least substantially corresponds with the angle of the uppermost section 56 of the sidewall 42 of the bracket 34, as will be readily appreciated by one of ordinary skill in the art upon review of this disclosure.

The hanger 74 is secured to the wall 22 by way of screws 72 (see FIG. 10). In order to hang the object, the same steps that are described above are followed, such that the outer portion of the upper rounded segment 82 of the hanger 74 is received within the recess region 58 of the bracket 34. In this orientation, it will be readily appreciated that the top wall 92 will be in close, face-to-face mating engagement with uppermost section 56 of the sidewall 42 of the bracket 34.

While the member 76 of the hanger 74 is similar in many respects to the member 60 of the hanger 36 described above, it will be readily understood by one of ordinary skill in the art that the upright, laterally spaced apart sidewall sections 90 of the member 76 inhibit relative rotation between the bracket and the hanger 74. In this way, the alternative hanger 74 may be particularly advantageous when hanging an object that has considerably more weight directed toward one lateral side thereof, is not desired to hang level, or at least an object where the bracket 34 is secured out of alignment with the center of gravity of the object, as will be readily appreciated by one of ordinary skill in the art upon review of this disclosure.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and access the reasonably fair scope of the present invention as pertains to any apparatus not materially departing from but outside the literal scope of the invention set forth in the following claims.

What is claimed is:

1. A wall mounting system for securely mounting a high cantilever load object on a wall, said object having a support member presenting a substantially flat rear face and a concavity extending forwardly from said rear face, said system comprising:
    a bracket configured for attachment to said rear face and including a projecting segment operable to extend into said concavity,
    said segment presenting an inclined hanging surface; and
    a hanger configured for attachment to said wall and having an inclined support surface,
    said hanger configured to extend into the projecting segment of said bracket with said support surface and said hanging surface being disposed in face-to-face, mating engagement,
    said support surface and said hanging surface being in contact with each other throughout a depth within said segment of at least about one-quarter inch.

2. A wall mounting system for securely mounting a high cantilever load object on a wall, said object having a support member presenting a substantially flat rear face and a concavity extending forwardly from said rear face, said system comprising:
    a bracket configured for attachment to said rear face and including a projecting segment operable to extend into said concavity,
    said segment presenting an inclined hanging surface; and
    a hanger configured for attachment to said wall and having an inclined support surface,
    said hanger configured to extend into the projecting segment of said bracket with said support surface and said hanging surface being disposed in face-to-face, mating engagement,
    said bracket including a primary plate engageable with said rear face and an integral, forwardly extending, hollow housing.

3. The wall mounting system as claimed in claim 2,
    said hanging surface being arcuate, located adjacent the upper end of said housing, and defining a recess.

4. The wall mounting system as claimed in claim 3,
    said housing having sufficient open area below said hanging surface to permit entry of said hanger into said housing beneath and in spaced relationship to said hanging surface.

5. The wall mounting system as claimed in claim 3,
    said hanger being of substantially frustoconical configuration with a smaller diameter end and a larger diameter end,
    said support surface extending between said smaller and larger diameter ends, said support surface being within said recess and engaging said arcuate hanging surface.

6. The wall mounting system as claimed in claim 5, said hanging and support surfaces being in face-to-face engagement throughout an arc of at least about 120°.

7. The wall mounting system as claimed in claim 6, said arc being about 180°.

8. The wall mounting system as claimed in claim 3, said hanging surface being oriented at an angle of about 45°, said support surface being angled to correspond with said hanging surface during engagement therewith.

9. The wall mounting system as claimed in claim 3, said hanger including a pair of upright, laterally spaced apart sidewall sections, said support surface being disposed between and abutting said upright, laterally spaced apart sidewall sections.

10. The wall mounting system as claimed in claim 2, said hanger being formed of metal.

11. The wall mounting system as claimed in claim 2, said object being a big game trophy mounted on a backer board, said backer board having said rear face.

12. In combination:
a high cantilever load object designed for hanging from a wall and having a support member presenting a substantially flat rear face, and a concavity extending forwardly from said rear face;
a bracket attached to said rear face and including a projecting segment extending into said concavity, said segment presenting an inclined hanging surface; and
a hanger attached to said wall and having an inclined support surface, said hanger extending into the projecting segment of said bracket with said support surface and said hanging surface being disposed in face-to-face, mating engagement.

13. The combination as claimed in claim 12, said support surface and said hanging surface being in contact with each other throughout a depth within said segment of at least about one-quarter inch.

14. The combination as claimed in claim 12, said bracket including a primary plate in engagement with said rear face and an integral, forwardly extending, hollow housing, said hanging surface being arcuate, located adjacent the upper end of said housing, and defining a recess.

15. The combination as claimed in claim 14, said hanging and support surfaces being in face-to-face engagement throughout an arc of between about 120° to about 180°.

16. The combination as claimed in claim 15, said hanger being of substantially frustoconical configuration with a smaller diameter end and a larger diameter end, said support surface extending between said smaller and larger diameter ends, said support surface being within said recess and engaging said arcuate hanging surface.

17. The combination as claimed in claim 15, said hanger including a pair of upright, laterally spaced apart sidewall sections, said support surface being disposed between and abutting said upright, laterally spaced apart sidewall sections.

18. The combination as claimed in claim 15, said hanging surface being oriented at an angle of about 45°, said support surface being angled to correspond with said hanging surface during engagement therewith.

19. In combination:
a load object designed for hanging from a wall and having a support member presenting a rear face, and a concavity extending forwardly from said rear face; and
a bracket including a primary plate attached to said rear face and a housing projecting into said concavity, said housing presenting an inclined, forwardly extending, arcuate hanging surface, said segment configured to receive a hanger attachable to said wall and having an inclined support surface configured for mating engagement with said hanging surface.

20. The combination as claimed in claim 19, said hanging surface being arcuate, located adjacent the upper end of said housing, and defining a recess.

21. The combination as claimed in claim 20, said hanging surface extending through an arc of about 180°.

22. The combination as claimed in claim 21, said hanging surface being oriented at an angle of about 45°.

* * * * *